United States Patent
Rohan

(10) Patent No.: US 9,442,717 B2
(45) Date of Patent: Sep. 13, 2016

(54) TECHNIQUES FOR AUTOMATICALLY IDENTIFYING INPUT FILES USED TO GENERATE OUTPUT FILES IN A SOFTWARE BUILD PROCESS

(71) Applicant: VMware, Inc., Palo Alto, CA (US)

(72) Inventor: Michael Rohan, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 41 days.

(21) Appl. No.: 14/332,165

(22) Filed: Jul. 15, 2014

(65) Prior Publication Data

US 2016/0019056 A1  Jan. 21, 2016

(51) Int. Cl.
  *G06F 9/45* (2006.01)
  *G06F 9/44* (2006.01)
  *G06F 11/34* (2006.01)

(52) U.S. Cl.
  CPC . *G06F 8/70* (2013.01); *G06F 8/41* (2013.01); *G06F 11/3466* (2013.01)

(58) Field of Classification Search
  None
  See application file for complete search history.

(56) References Cited

U.S. PATENT DOCUMENTS

| | | | |
|---|---|---|---|
| 6,049,666 A | 4/2000 | Bennett et al. | |
| 6,126,329 A | 10/2000 | Bennett et al. | |
| 6,282,703 B1 * | 8/2001 | Meth et al. | 717/163 |
| 7,225,343 B1 * | 5/2007 | Honig et al. | 713/194 |
| 7,552,093 B2 | 6/2009 | Levin et al. | |
| 7,565,348 B1 | 7/2009 | Waldin et al. | |
| 7,571,434 B1 * | 8/2009 | Kamen | G06F 8/70 717/142 |
| 7,661,089 B2 | 2/2010 | Cope et al. | |
| 7,711,719 B1 | 5/2010 | Waldin et al. | |
| 8,160,947 B2 | 4/2012 | Oey | |
| 8,307,351 B2 * | 11/2012 | Weigert | 717/141 |
| 2006/0075462 A1 * | 4/2006 | Golan et al. | 726/1 |
| 2008/0104096 A1 * | 5/2008 | Doval et al. | 707/101 |
| 2009/0150866 A1 * | 6/2009 | Schmidt | 717/120 |
| 2010/0242028 A1 * | 9/2010 | Weigert | 717/131 |
| 2011/0202905 A1 * | 8/2011 | Mahajan | 717/140 |
| 2012/0240096 A1 * | 9/2012 | Sass | 717/101 |
| 2013/0326479 A1 * | 12/2013 | Russell et al. | 717/121 |
| 2014/0181803 A1 * | 6/2014 | Cooper et al. | 717/178 |
| 2015/0082443 A1 * | 3/2015 | Behar et al. | 726/26 |

* cited by examiner

Primary Examiner — Isaac T Tecklu

(57) ABSTRACT

Techniques for automatically identifying input files used to generate output files in a software build process are provided. In one embodiment, a computer system can execute one or more build commands for generating output files for a software product, where the software product is associated with a build tree comprising various input files. The computer system can further intercept system calls invoked during the execution of the one or more build commands and can collect information pertaining to at least a portion of the intercepted system calls. The computer system can then create a dependency graph based on the collected information, where the dependency graph identifies a subset of input files in the build tree that are actually used by the one or more build commands to generate the output files.

18 Claims, 8 Drawing Sheets

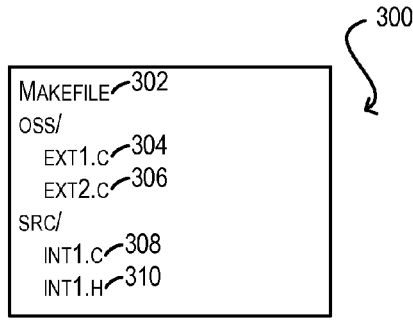

FIG. 3

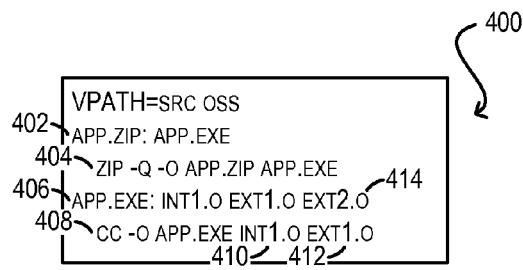

FIG. 4

```
$ dagen -o xmpl.dax -L 3 -S --domain:source $PWD --domain:tmp /tmp -- /usr/bin/make
This is DAGEN, V1.1.0 - CLN#286311 for Linux/i686 on Wed Jan 29 09:54:26 2014
DAGEN running on Linux - 3.5.0-45-generic - i686
DAGEN levels: statelevel + statslevel + level3
DAGEN executing the command: /usr/bin/make
cc -c -o int1.o src/int1.c
cc -c -o ext1.o oss/ext1.c
cc -c -o ext2.o oss/ext2.c
cc -o app.exe int1.o ext1.o
zip -q -o app.zip app.exe
DAGEN intercepted 3207 system calls
DAGEN handled 835 system calls
DAGEN elapsed time 0:00:00, completed on Wed Jan 29 09:54:26 2014
```

FIG. 5

```
<DEPENDENCY-ANALYSIS>
<PROCESS VPID="1" NAME="MAKE" EXIT-STATUS="0">
  <EXECUTABLE DOMAIN="FILESYSTEM">
    <PATH>USR/BIN/MAKE</PATH>
  </EXECUTABLE>
  <INPUTS DOMAIN="SOURCE">
    <PATH>MAKEfILE</PATH>
  </INPUTS>
</PROCESS>
...
<PROCESS VPID="3" VPPID="2" NAME="CC1" EXIT-STATUS="0">
  <EXECUTABLE DOMAIN="FILESYSTEM">
    <PATH>USR/LIB/GCC/I686-LINUX-GNU/4.7/CC1</PATH>
    ...
  </EXECUTABLE>
  <INPUTS DOMAIN="SOURCE">
    <PATH>SRC/INT1.C</PATH>
    <PATH>SRC/INT1.H</PATH>
  </INPUTS>
  <OUTPUTS DOMAIN="TMP">
    <PATH>CCPZ35VS.S</PATH>
  </OUTPUTS>
</PROCESS>
<PROCESS VPID="4" VPPID="2" NAME="AS" EXIT-STATUS="0">
  <EXECUTABLE DOMAIN="FILESYSTEM">
    <PATH>USR/BIN/AS</PATH>
    ...
  </EXECUTABLE>
  <INPUTS DOMAIN="SOURCE">
    <PATH>INT1.O</PATH>
  </INPUTS>
  <INPUTS DOMAIN="TMP">
    <PATH>CCPZ35VS.S</PATH>
  </INPUTS>
  <OUTPUTS DOMAIN="SOURCE">
    <PATH>INT1.O</PATH>
  </OUTPUTS>
</PROCESS>
...

<PROCESS VPID="13" VPPID="12" NAME="LD" EXIT-STATUS="0">
  <EXECUTABLE DOMAIN="FILESYSTEM">
    <PATH>USR/BIN/LD</PATH>
    ...
  </EXECUTABLE>
  <INPUTS DOMAIN="SOURCE">
    <PATH>APP.EXE</PATH>
    <PATH>EXT1.O</PATH>
    <PATH>INT1.O</PATH>
  </INPUTS>
  <OUTPUTS DOMAIN="SOURCE">
    <PATH>APP.EXE</PATH>
  </OUTPUTS>
</PROCESS>
<PROCESS VPID="14" VPPID="1" NAME="ZIP" EXIT-STATUS="0">
  <EXECUTABLE DOMAIN="FILESYSTEM">
    <PATH>USR/BIN/ZIP</PATH>
    ...
  </EXECUTABLE>
  <INPUTS DOMAIN="SOURCE">
    <PATH>APP.EXE</PATH>
  </INPUTS>
  <OUTPUTS DOMAIN="SOURCE">
    <PATH>APP.ZIP</PATH>
  </OUTPUTS>
</PROCESS>
</DEPENDENCY-ANALYSIS>
```

*FIG. 7*

TECHNIQUES FOR AUTOMATICALLY IDENTIFYING INPUT FILES USED TO GENERATE OUTPUT FILES IN A SOFTWARE BUILD PROCESS

BACKGROUND

In the field of computer software, the process of "building" a software product involves taking as input the product's source files (and potentially other types of files such as pre-compiled libraries, data, content, etc.) and converting those input files into output files that can be used by end-users to run the software product on their respective computing devices. For input files that are source files or libraries, this build process can include, e.g., compiling and/or linking the source files/libraries to generate executable binaries for the product. The build process can also merge, split, compress, copy and/or otherwise manipulate the various input files (as well as intermediate files created from the input files) so that they are in an appropriate format for product release. Typically, the total set of files that may be provided as input to the build process is maintained in a directory structure known as a "build tree."

As software has become more complex, it has become increasingly common for software developers to incorporate "external files" into their software products (i.e., files that originate, either wholly or in part, from entities that are different from the developer that produces a given product). Examples of external files include source/library files from open source projects, content files (e.g., images, audio clips, etc.) from stock content agencies, and so on. While the use of external files can speed-up/ease software development, in many cases such files are subject to third-party property rights or restrictions (e.g., licenses, copyrights, patents, etc.) that can affect the property rights owned by a developer in its overall software product. Thus, it is important for software developers to monitor which external files are used in their products so that they can understand and comply with those third-party rights/restrictions. This monitoring generally involves (1) determining the files in a build tree that are external files, and (2) identifying, for a given product build/release, which of those external files actually contribute to one or more of the output files of the build process.

For very small-scale software projects, it is possible to carry out steps (1) and (2) above manually. However, this manual approach quickly becomes unworkable as project size and complexity increases. For instance, a large software product may have tens of thousands of files in its build tree, of which a significant percentage are external files. Similarly, the software product may include tens of thousands of output files in its released form. In such a scenario, manually tracking the external files in the build tree and mapping the files from build output to build input can be extremely time-consuming, cumbersome, and error-prone.

There are existing tools (referred to as "static build tree analysis tools") that can automate step (1) to an extent—in particular, these tools can analyze a build tree and generate a list of files in the build tree that originate, wholly or in part, from an external source (such as files/code subject to an open source license). However, static build tree analysis tools generally do not help with respect to step (2) (i.e., identifying which external files are actually used/incorporated in a released product). To understand this, note that the set of files in a build tree and the set of files that are used to generate build output are not necessarily the same; there are many reasons why a file in the build tree may not contribute to any of the output files of a build process. As one example, the file may have been placed in the build tree for testing/prototyping purposes, and thus may be excluded from the build specification for a final product release. Accordingly, static build tree analysis tools, which simply determine the external files in a build tree, do not address the problem of tracking which of those external files actually make it into the product that reaches end-users.

Further, there are some open source licenses where the nature of the license not only depends on whether a particular source file/code portion is used in a product release, but also on how the file/code is incorporated. For instance, one type of open source license may allow for unrestricted use of source code if the code is linked as a dynamic library, but may include restrictions if the same code is linked in a static fashion. For external files/code that are subject to these and other similar licenses, software developers have the added burden of tracking not just if, but also how, they make use of such files/code when building their products.

SUMMARY

Techniques for automatically identifying input files used to generate output files in a software build process are provided. In one embodiment, a computer system can execute one or more build commands for generating output files for a software product, where the software product is associated with a build tree comprising various input files. The computer system can further intercept system calls invoked during the execution of the one or more build commands and can collect information pertaining to at least a portion of the intercepted system calls. The computer system can then create a dependency graph based on the collected information, where the dependency graph identifies a subset of input files in the build tree that are actually used by the one or more build commands to generate the output files.

The following detailed description and accompanying drawings provide a better understanding of the nature and advantages of particular embodiments.

BRIEF DESCRIPTION OF THE DRAWINGS

FIG. 3 depicts an example build tree listing according to an embodiment.

FIG. 4 depicts an example makefile according to an embodiment.

FIG. 5 depicts example command line output from a DAGEN build wrapper component according to an embodiment.

FIG. 7 depicts a representation of the dependency graph of FIG. 6 in Extensible Markup Language (XML) according to an embodiment.

DETAILED DESCRIPTION

Figure 1:
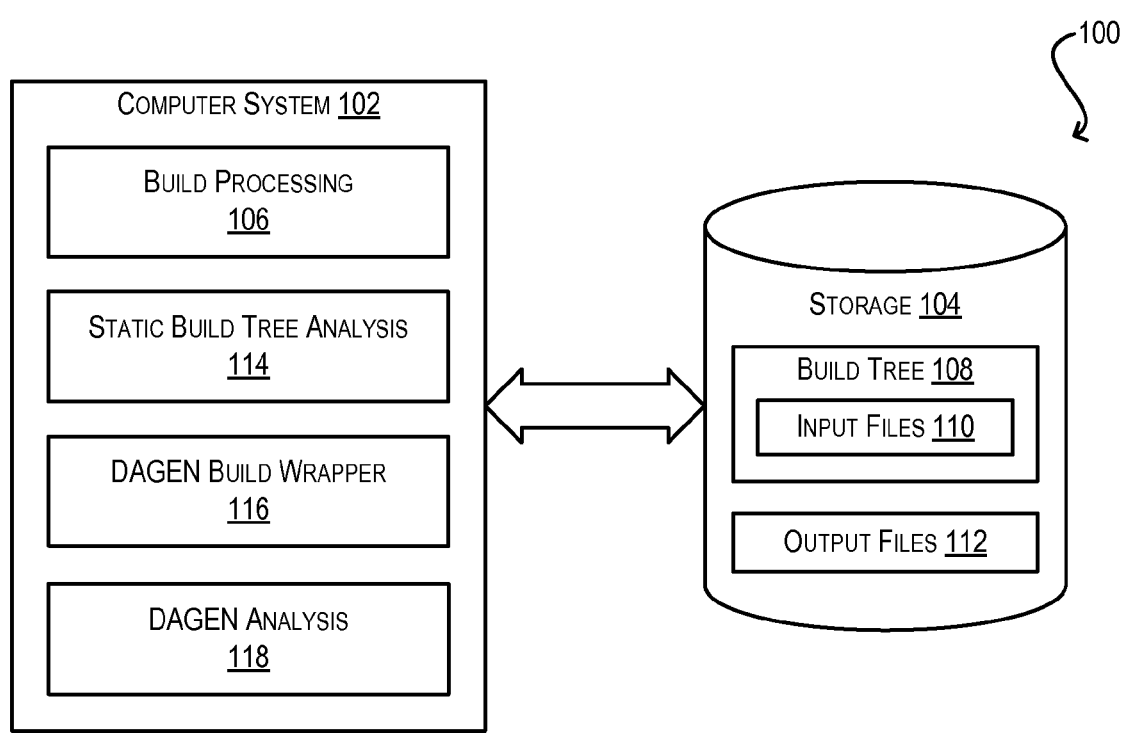
FIG. 1 depicts a system environment for automatically identifying input files used to generate output files in a software build process according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes a framework (referred to as "Dependency Analysis Generation," or DAGEN) for automatically determining mappings between output files generated by a software build process and input files provided to the build process from a build tree. Stated another way, the DAGEN framework automatically identifies which of the files in the build tree (e.g. source files, library files, data/content files, etc.) are actually used by the build process to generate output files for, e.g., a product release.

In one embodiment, the DAGEN framework can include two components: a build wrapper component and a build analysis component. The build wrapper component can initiate a build process by executing one or more build commands exposed by a conventional build system, with instrumentation to intercept system calls invoked by the build commands (or their child processes) during the build process. This instrumentation can be implemented using, e.g., an OS kernel-level system call tracing utility, such as ptrace on Linux, dtrace on Unix variants like Solaris, FreeBSD, and MacOS, and event tracing on Windows. Upon intercepting a system call pertaining to process creation, file access, or file creation, the build wrapper component can log information regarding the system call (e.g., process name/ID, names of files accessed and/or created, etc.). These interception/logging steps can repeat until the build commands have completed their execution. Note that the build wrapper component does not interfere with the operation of the build process itself; the build wrapper component simply looks for and collects information regarding how the various processes and sub-processes spawned by the build commands create and access files.

Once the build process has ended, the build wrapper component can generate, using the logged information, a dependency graph that identifies paths between the output files of the build process and corresponding input files in a build tree that were used to build each output file. For example, if the build process compiled/linked input files I1 and I2 to create an output file O1, the dependency graph would include paths leading from I1 and I2 to O1 (with any intermediate objects/files created along each path). Thus, the dependency graph can effectively identify which files in the build tree were actually used to create the output files of the build process. In certain embodiments, the dependency graph can also identify how each input file was used (e.g., whether the file was dynamically linked, statically linked, etc.).

The build analysis component of the DAGEN framework can then leverage this dependency graph in various ways. For instance, in a particular embodiment, the build analysis component can receive (from, e.g., a conventional static build tree analysis tool) a list of files in the build tree that are external files. The build analysis component can then traverse the dependency graph, compare the external file list with the input files that were used to create the build output, and return a list of input files that match the external file list. In this manner, the build analysis component can automatically identify the input files "in" the product release that originated from external sources, which can be used for license compliance review or other purposes. In implementations where the dependency graph includes metadata regarding how each input file was used, the build analysis component can also return this metadata as part of its output, which may be useful for certain types of open source licenses (e.g., licenses that depend on how source code is linked, as noted in the Background).

In alternative embodiments, the build analysis component can perform other types of analysis tasks with respect to the dependency graph, such as identifying files shared between different products within an organization, identifying file usage before and after a corporate merger or acquisition, identifying file usage between different product builds/releases, and so on. In these embodiments, the build analysis component can simply take as input a list of files to be matched that conform to a different set of criteria than the "external file" example above.

The foregoing and other features of the DAGEN framework are described in further detail in the sections that follow.

FIG. 1 depicts a system environment 100 that supports the DAGEN framework according to an embodiment. As shown, system environment 100 includes a computer system 102 that is communicatively coupled with a storage component 104. Computer system 102 can be any conventional computing device known in the art, such as a desktop system, a laptop, a server system, or the like. Storage component 104 can be a component that is located remotely from computer system 102 (such as a networked storage array) or locally attached to computer system 102 (such as a commodity magnetic or solid-state hard disk).

In the example of FIG. 1, computer system 102 is configured to build a software product that is associated with a build tree 108 comprising input files 110 on storage component 104. Input files 110 can include, e.g., source files, pre-compiled library files, data files, content files, etc. for the product. To that end, computer system 102 includes a build processing component 106. Build processing component 106 can correspond to any conventional software build system, tool, or group of tools known in the art. For example, in a particular embodiment, build processing component 106 can correspond to the "Make" utility that is available on Linux and Unix variants. At the time of a build, build processing component 106 can spawn one or more processes/sub-processes that retrieve, as input, at least a portion of input files 110 from storage component 104. These processes/sub-processes can then convert (e.g., compile, link, compress, copy, etc.) the retrieved input files into output files 112. Output files 112 can include, e.g., executable binaries and/or other types of files that are suitable for product release (e.g., installer files, compressed data files, etc.). In this way, build processing component 106 can generate a "shippable" version of the product that may be released to, and used by, end-users/customers.

As discussed in the Background section, one challenge with managing the development of a software product is that the product may incorporate files that originate, either wholly or in part, from sources that are external to the development organization creating the product. For instance, in FIG. 1, input files 110 of build tree 108 may include external source files from, e.g., an open source project that are compiled by build processing component 106 into output files 112 and shipped to customers. If this type of external file usage is not tracked and managed appropriately, it can adversely affect the property rights that the developer has in the released product.

It is possible to examine, via a static build tree analysis tool such as tool 114 shown in FIG. 1, all of the input files in a build tree and determine a subset of those files that meet a predefined set of criteria. For example, static build tree analysis tool 114 can be used to identify a subset of input files 110 of build tree 108 that contain open source content. However, such tools cannot inform a software developer whether a particular input file was actually used/incorporated into the output files of a product. This distinction is significant because it is ultimately the files that go into the released product (not simply the files in the build tree, which may or may not be used during the build process) that determine the legal status of the product as a whole.

To address the foregoing and other similar issues, computer system 102 of FIG. 1 includes a novel build wrapper component (shown as DAGEN build wrapper 116) and a novel build analysis component (shown as DAGEN analysis 118). DAGEN components 116 and 118 can be implemented in software, in hardware, or as a combination thereof. As detailed below, DAGEN build wrapper 116 can work in concert with build processing component 106 during a software build to automatically identify which input files 110 in build tree 108 are actually used to generate output files 112, and how those input files are used. In addition, DAGEN analysis 118 can work in concert with static build tree analysis tool 114 (or other types of automated or manual build tree analysis techniques) to automatically identify which of the input files identified by DAGEN build wrapper 116 match a predefined set of criteria (e.g., files that originate from an external source, files that contain certain content, etc.). In this manner, DAGEN components 116 and 118 can enable software developers to more easily track file/code usage in their software products, leading to reduced risk with respect to third-party property rights/restrictions and greater visibility into the development and build processes.

Figure 2:
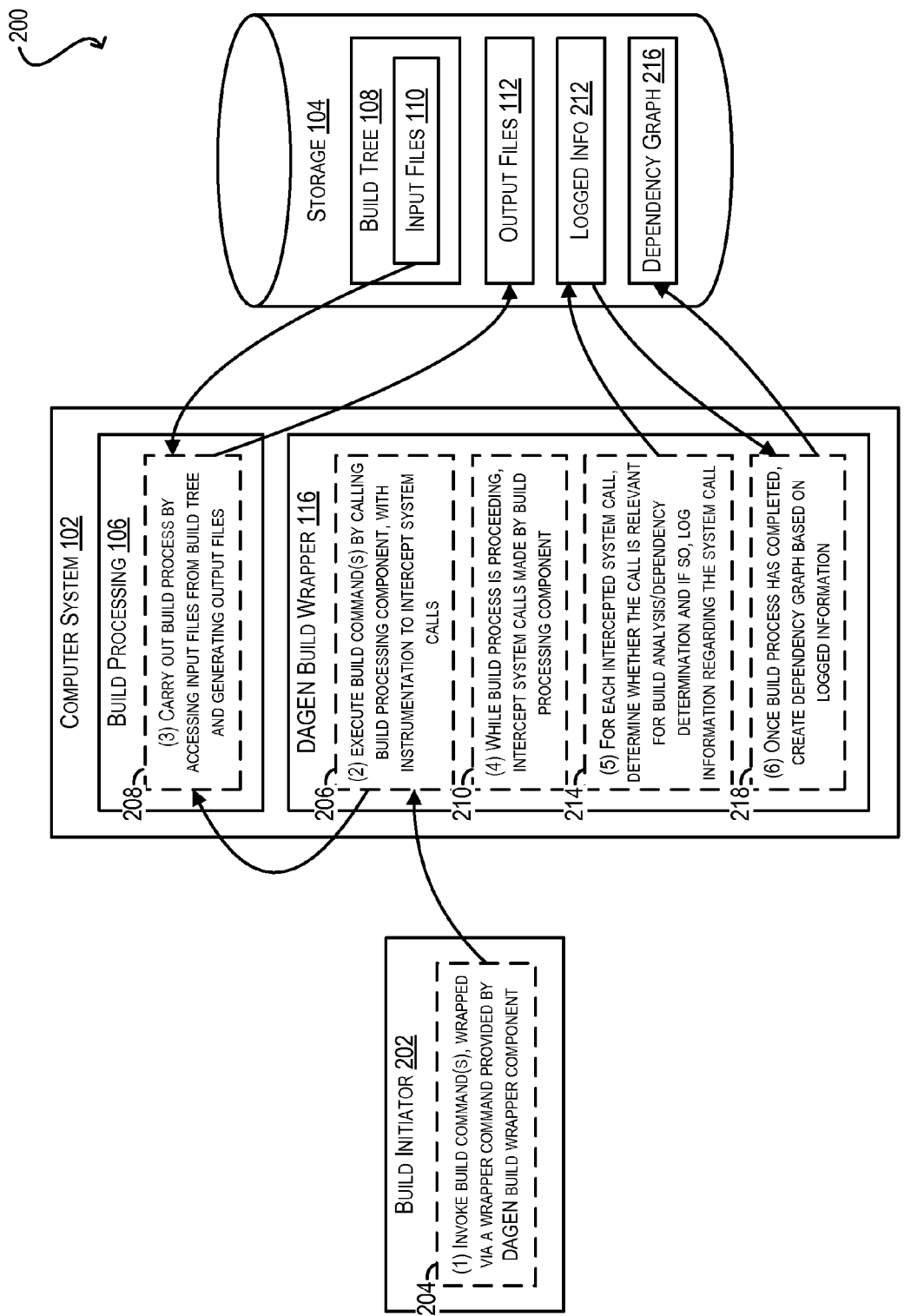
FIG. 2 depicts a build workflow within the system environment of FIG. 1 according to an embodiment.

FIG. 2 depicts a high-level workflow 200 that can be performed by DAGEN build wrapper 116 (in conjunction with build processing component 106) during a software build to map build output to build input according to an embodiment. Starting with step (1) (reference numeral 204), a build initiator 202 (e.g., a user, an automated agent, etc.) can initiate the build process by invoking one or more conventional build commands exposed by build processing component 106, wrapped via a wrapper command exposed by DAGEN build wrapper 116. For example, assume that the build command exposed by build processing component 106 is the well-known "make" command, and the wrapper command exposed by DAGEN build wrapper 116 is "dagen." In this case, build initiator 202 can invoke "dagen make," along with appropriate values/strings to identify the product being built and other build parameters.

At step (2) (reference numeral 206), DAGEN build wrapper 116 can receive the invocation of the wrapper command and can call build processing component 106 (on behalf of build initiator 202) to execute the wrapped build commands. For instance, in the "dagen make" example above, DAGEN build wrapper 116 can call build processing component 106 to execute "make." However, rather than simply invoking the build commands, DAGEN build wrapper 116 can also instrument the build commands so that wrapper 116 can monitor the system calls made by the commands (or their child processes) as they run. As known in the art, system calls are OS kernel-level APIs that applications (such as build processing component 106) use to request privileged services from the OS kernel, such as creating/executing new processes, accessing/modifying files, and so on. Thus, by instrumenting the build commands to monitor such system calls, DAGEN build wrapper 116 can examine exactly what build processing component 106 is doing during the build process. In one embodiment, DAGEN build wrapper 116 can use the Linux "ptrace" utility to implement this instrumentation. In other embodiments, DAGEN build wrapper 116 can use any other system call tracing utility (e.g., dtrace, Windows event tracing, etc.).

At step (3) (reference numeral 208), build processing component 106 can carry out the build process per its normal operation in response to the build command invocations made by DAGEN build wrapper 116. As part of this step, build processing component 106 can access one or more input files 110 from build tree 108 and can generate output files 112.

While the build process is proceeding, DAGEN build wrapper 116 can intercept system calls made by the processes/sub-processes of build processing component 106 via the instrumentation noted with respect to step (2) (step (4), reference numeral 210). Further, for each intercepted system call, DAGEN build wrapper 116 can determine whether the call is relevant for build analysis/dependency determination and, if so, can log information regarding the system call as logged information 212 (step (5), reference numeral 214). In certain embodiments, DAGEN build wrapper 116 can determine that an intercepted system call is relevant if it pertains to process creation, file access, or file creation. In these cases, DAGEN build wrapper 116 can log information regarding, e.g., the process IDs created, the file names accessed or created, etc.

Finally, once the build process has ended (i.e., build processing component 106 has completed its execution), DAGEN build wrapper 116 can generate, using logged information 212, a dependency graph 216 for the build process (step (6), reference numeral 218). As mentioned previously, dependency graph 216 can indicate paths between output files 112 created by build processing component 106 and the subset of input files 110 from build tree 108 used by component 106 to create those output files. In this way, dependency graph 216 can indicate exactly which input files were used to generate the output files. In a particular embodiment, dependency graph 216 can also include, for each input (or intermediate) file in the graph, metadata identifying how the file was used during the build process (e.g., statically linked, dynamically linked, etc.).

To further clarify workflow 200 of FIG. 2, FIGS. 3-7 depict various artifacts that may be used or generated by DAGEN build wrapper 116/build processing component 106 during an exemplary build process run according to an embodiment. For instance, FIG. 3 depicts an example build tree 300 comprising input files 302-310 that may be used as input to the build process. As shown, build tree 300 include two source files 304 and 306 under a "OSS" directory (ext1.0 and ext2.0 respectively) and two source files 308 and 310 under a "SRC" directory (int1.0 and int1.h respectively). In this example, it is assumed that 304 and 306 are external source files, while 308 and 310 are internal (i.e., proprietary) source files.

Build tree 300 also includes a makefile 302 that specifies the targets (e.g., intermediate files and output files) of the build process and how those targets should created. For example, FIGS. 4 depicts an exemplary version of makefile 302 (400) that specifies two targets app.zip (402) and app.exe (406), along with the explicit commands needed to generate the targets ("zip —q—o app.zip app.exe" (404) and "cc—o app. exe int1.o ext1.o" (408) respectively).

FIG. 5 depicts command line output 500 that may be generated by DAGEN build wrapper 116 upon executing a wrapped invocation of the "make" build command (502) with respect to makefile 400. In particular, this command line output shows the commands/processes that are executed by build processing component 106 as part of the build, as well as the order of those commands/processes. For instance, command line output 500 shows that a first instance of the "cc" command (504) is used to compile int1.c into intermediate object int1.o; a second instance of the "cc" command (506) is used to compile ext1.c into intermediate object ext1.o; a third instance of the "cc" command (508) is used to compile file ext2.c into intermediate object ext2.o; a fourth instance of the "cc" command (408) is used to compile files int1.o and ext1.o into file app.exe; and an instance of the "zip" command (404) is used to compress file app.exe into app.zip. File app.zip corresponds to an output file that would be included in the released version of the product. Command line output 500 also shows that DAGEN build wrapper 116 intercepted 3207 system calls during the build process, of which 835 were "handled" (i.e., were deemed relevant to process creation, file access, or file creation, and thus were logged).

Figure 6:
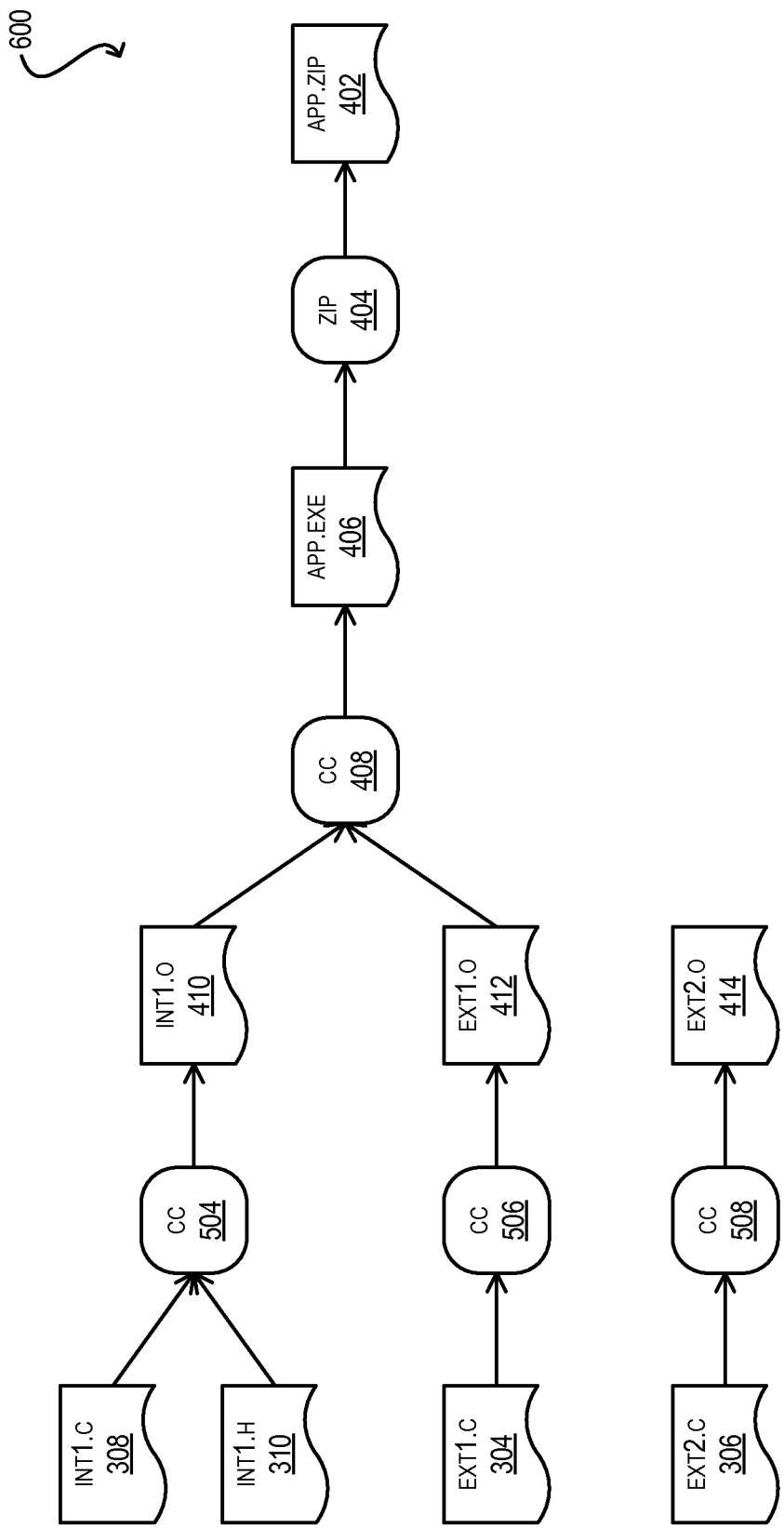
FIG. 6 depicts an example dependency graph according to an embodiment.

FIG. 6 depicts an example dependency graph 600 created by DAGEN build wrapper 116 at the conclusion of the build process executed with respect to FIGS. 3-5. As shown, dependency graph 600 includes paths between output file app.zip and input files int1.c, int1.h, and ext1.c illustrating how these input files were used to generate app.zip. Thus, int1.c, int1.h, and ext1.c can be considered to constitute the subset of input files in build tree 300 actually used to generate the output for this build run. Notably, dependency graph 600 also includes a reference to input file ext2.c; however ext2.c was only used to generate intermediate object ext2.o, and did not contribute to the generation of output file app.zip. Thus, ext2.c would not be considered to be part of the product release corresponding to this build run.

It should be appreciated that FIG. 6 depicts a schematic representation of dependency graph 600, and that this graph can be encoded according to a number of different machine-readable formats. By way of example, FIG. 7 illustrates an encoding 700 of representative portions of dependency graph 600 in Extensible Markup Language (XML) format.

Figure 8:
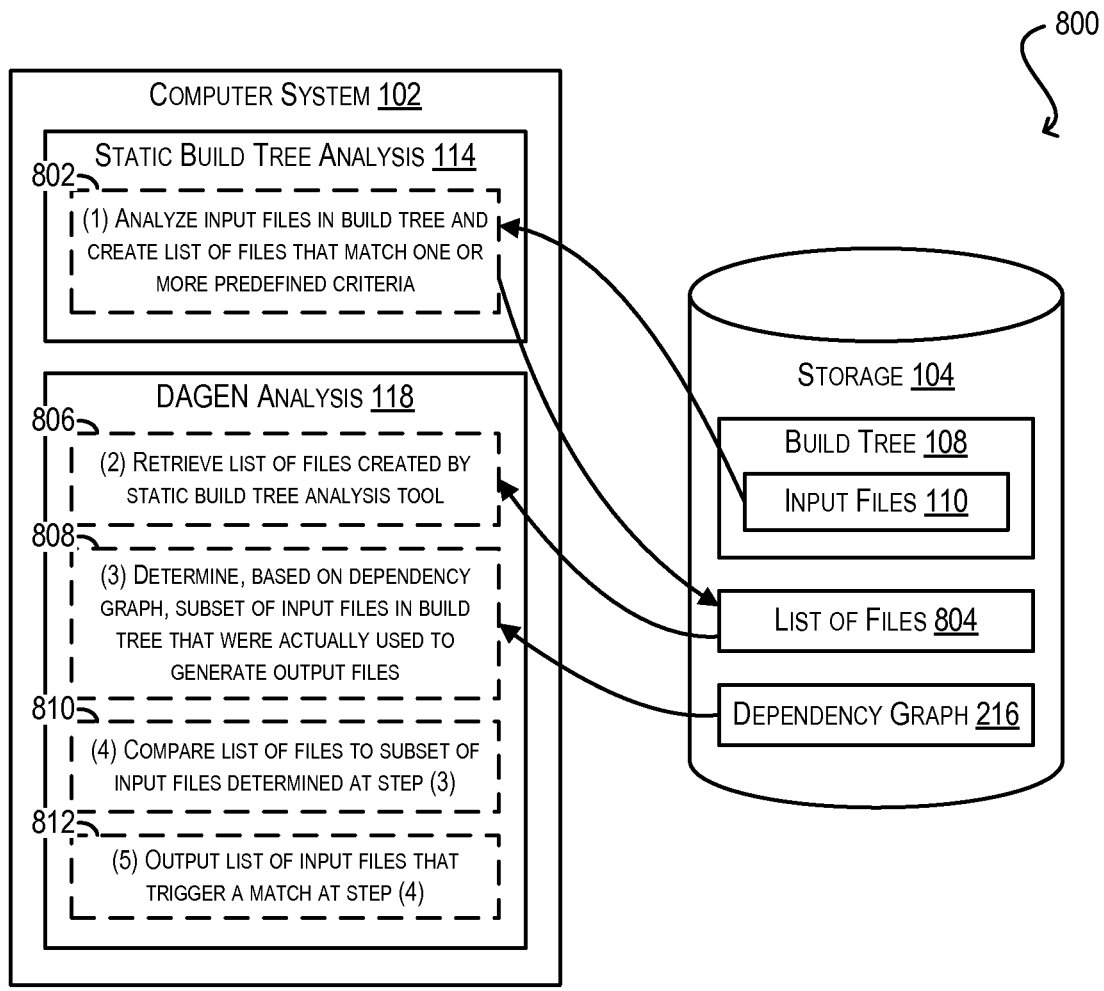
FIG. 8 depicts a build analysis workflow within the system environment of FIG. 1 according to an embodiment.

As mentioned previously, once DAGEN build wrapper 116 has generated a dependency graph, DAGEN analysis 118 can analyze the dependency graph in various ways. FIG. 8 depicts a high-level workflow 800 that can be performed by DAGEN analysis 118 (in conjunction with static build tree analysis tool 114) to determine which of the "output contributing" input files (i.e., input files identified as contributing to build output in the dependency graph) match one or more predefined criteria according to an embodiment. It is assumed that workflow 800 is performed after build workflow 200 of FIG. 2.

At step (1) (reference numeral 802), static build tree analysis tool 114 can first analyze input files 110 in build tree 108 and create a list of files 804 that match a set of predefined criteria. In one set of embodiments, this set can include criteria for identifying files that contain open source content or originate from external sources. In other embodiments, the set can include criteria for identifying files from a different internal development group, files created prior to a company acquisition/merger, files from a previous product release, files impacted by a particular software bug or patch, and so on. One of ordinary skill in the art will recognize many variations and modifications, and alternatives for this criteria set.

At steps (2) and (3) (reference numerals 806 and 808), DAGEN analysis 118 can retrieve file list 804 and determine, based on dependency graph 216 created during workflow 200, the subset of input files 110 that were actually used to generate output files 112 during the build process. In certain embodiments, step (3) can comprise traversing, from each output file, dependency graph 216 backwards to identify the input files that contributed to that output file.

At step (4) (reference numeral 810), DAGEN analysis 118 can compare file list 804 with the subset of input files determined at step (3) in order to identify the overlap between these two file groups. Finally, at step (5) (reference numeral 812), DAGEN analysis 118 can output the list of input files that are matched at step (4). The list of input files returned at step (5) represent the input files in build tree 108 that were used to generate build output, as well as match the set of predefined criteria applied by static build tree analysis tool 114. For example, in a particular embodiment, the list of input files returned at step (5) can represent the "output contributing" input files that originate from external sources. This list can then be used for, e.g., license compliance review or other purposes. In cases where dependency graph 216 includes metadata identifying how each input file is used, this metadata can also be returned as part of step (5), thereby allowing compliance with licenses that vary by code usage (e.g., static vs. dynamic linking)

Figure 9:
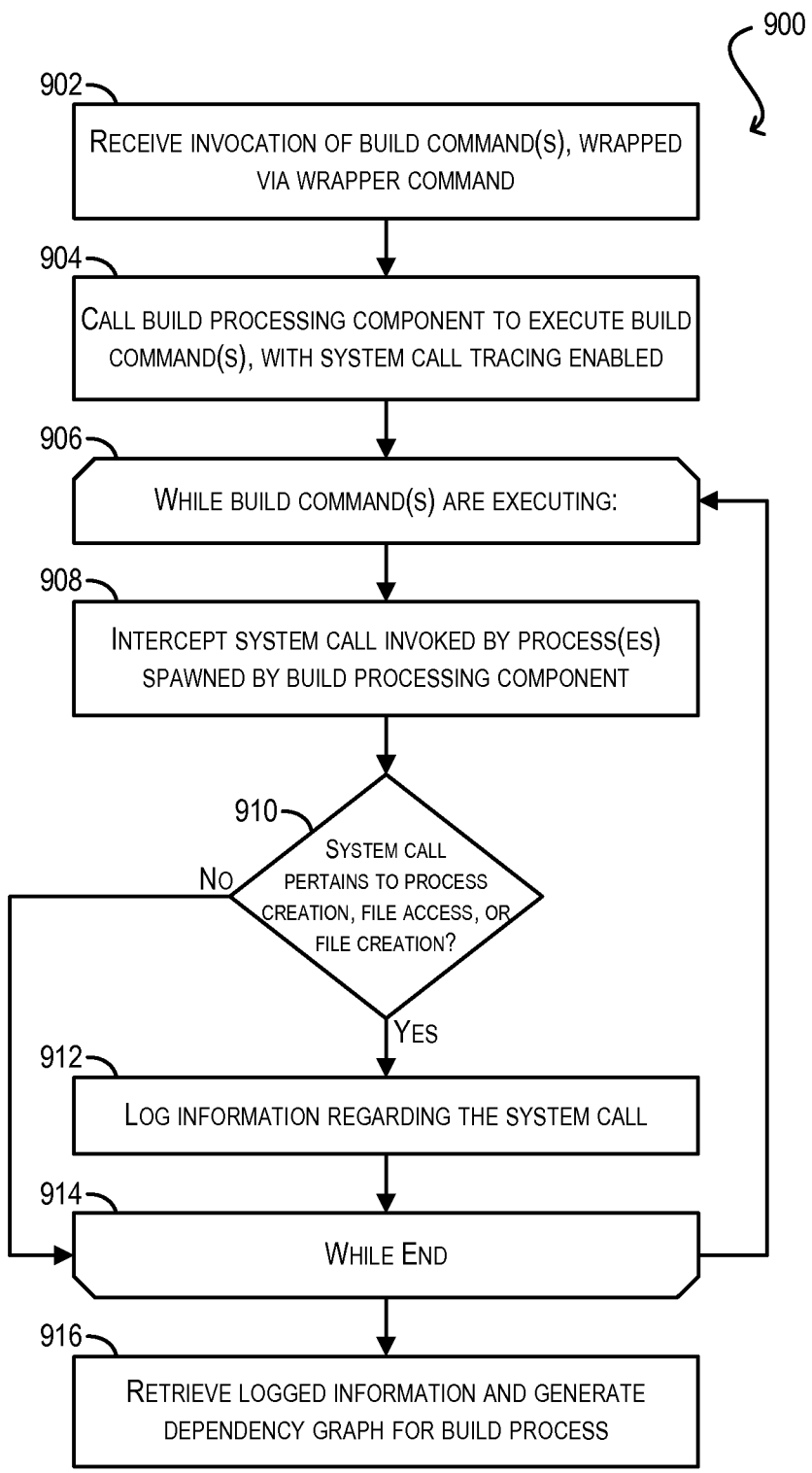
FIG. 9 depicts a flowchart performed during the build workflow of FIG. 2 according to an embodiment.
Figure 10:
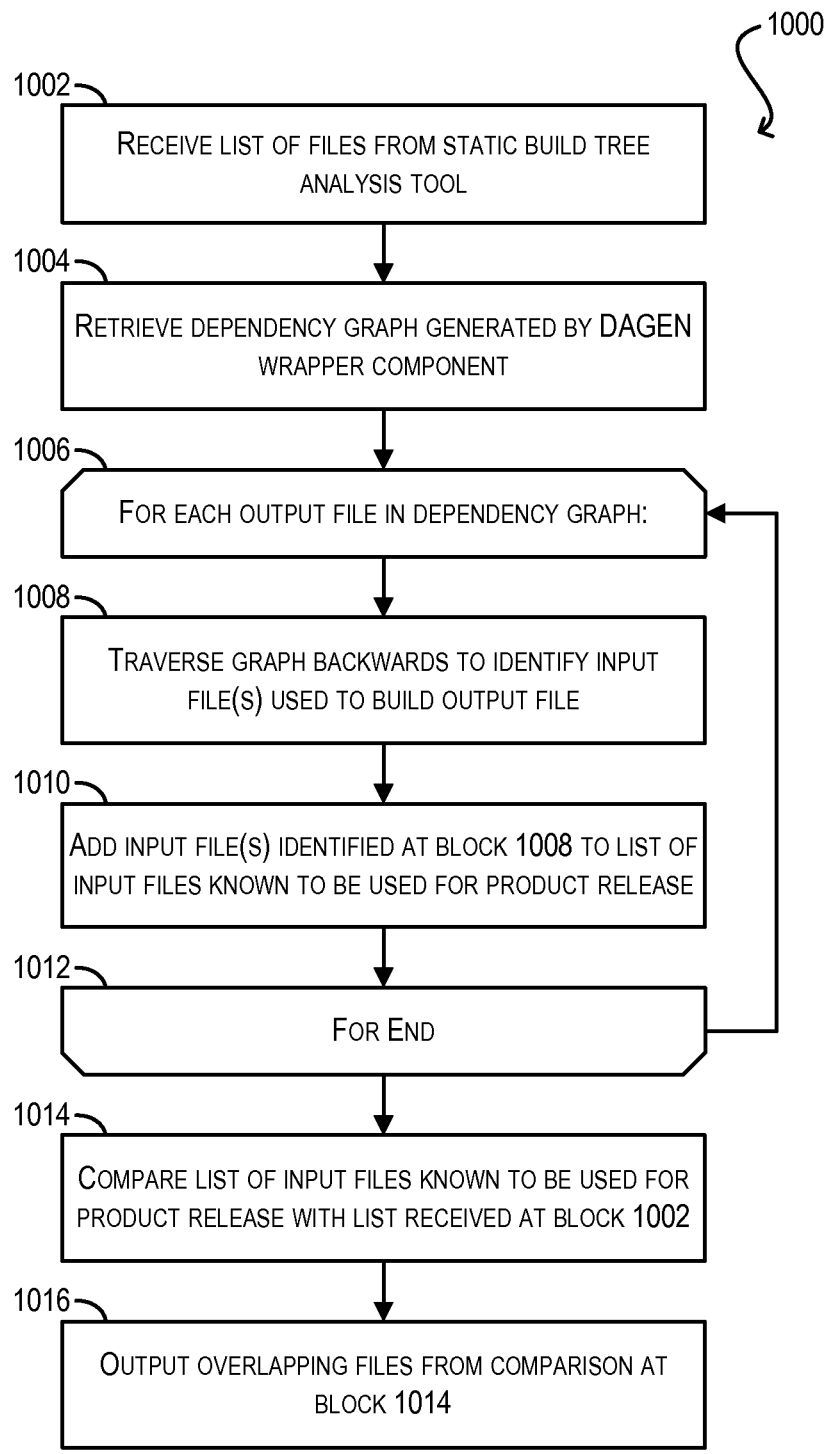
FIG. 10 depicts a flowchart performed during the build analysis workflow of FIG. 8 according to an embodiment.

The remainder of this disclosure presents flowcharts of the processing attributed to DAGEN build wrapper 116 and DAGEN analysis 118 in FIGS. 2 and 8 respectively according to an embodiment. In particular, FIG. 9 depicts a flowchart 900 performed by DAGEN build wrapper 116 in the context of workflow 200, and FIG. 10 depicts a flowchart 1000 performed by DAGEN analysis 118 in the context of workflow 800.

Starting with flowchart 900, at block 902, DAGEN build wrapper 116 can receive an invocation of one or more build commands from a build initiator (e.g., 202 of FIG. 2), where the build commands are wrapped via a wrapper command exposed by DAGEN build wrapper 116. As noted previously, one example of such a wrapped build command invocation is "dagen make."

At block 904, DAGEN build wrapper 116 can call build processing component 106 in order to execute the wrapped build commands. As part of this block, DAGEN build wrapper 116 can instrument the build command execution to enable system call tracing via, e.g., an OS kernel-level system call tracing utility like ptrace (or a functional equivalent).

At block 906, DAGEN build wrapper 116 can enter a loop while the build commands are being executed by build processing component 106. Within the loop, DAGEN build wrapper 116 can intercept a system call invoked by a process spawned by build processing component 106 (or a child process) (block 908), and can check whether the intercepted system call pertains to process creation, file access, or file creation (block 910). If so, DAGEN build wrapper 116 can log information regarding the system call, such as the process ID created, the names of the files accessed or created, etc. (block 912).

If the intercepted system call does not meet the condition of block 910 (or if block 912 is executed), DAGEN build wrapper 116 can proceed to the end of the loop (block 914) and can return to the loop start to handle additional system calls.

Once build processing component 106 has finished its execution, DAGEN build wrapper 116 can retrieve the accumulated system call information logged at block 912. DAGEN build wrapper 116 can then generate, using the logged information, a dependency graph for the build process in accordance with the previous sections of this disclosure (block 916).

Turning now to flowchart 1000, at block 1002, DAGEN analysis 118 can receive a file list from static build tree analysis tool 114 that meets a predefined set of criteria. For instance, the file list can identify files in build tree 108 that, e.g., contain open source content, come from an external source, etc.

At blocks 1004 and 1006, DAGEN analysis 118 can retrieve the dependency graph generated by DAGEN build wrapper 116 at block 916 and can enter a loop for each output file in the dependency graph. Within the loop, DAGEN analysis 118 can traverse the dependency graph backwards (from the output file) to identify the input files used to generate the output file (block 1008). DAGEN analysis 118 can then add the input files identified at block 1008 to a list of input files known to be used for the current product release (block 1010), and can return to block 1006 to process additional output files.

Once all of the output files in the dependency graph have been processed, DAGEN analysis 118 can compare the list of input files known to be used for the product release with the file list received at block 1002 (block 1014). Finally, at block 1016, DAGEN analysis 118 can output the overlapping files from the comparison at block 1014.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Plural instances can be provided for components, operations, or structures described herein as a single instance. In addition, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
executing, by a computer system, one or more build commands for generating output files for a software product, the software product being associated with a build tree comprising input files;
concurrently with the executing of the one or more build commands:
intercepting, by the computer system, operating system calls invoked by the one or more build commands; and
for each intercepted operating system call:
determining whether the intercepted operating system call is relevant to process creation, file access, or file creation; and
if the intercepted operating system call is relevant to process creation, file access, or file creation, collecting, by the computer system, information pertaining to the intercepted operating system call, wherein collecting information pertaining to the intercepted operating system call comprises:
logging information regarding one or more input files that are accessed or one or more output files that are created by the one or more build commands using the intercepted operating system call; and
creating, by the computer system, a dependency graph based on the collected information, the dependency graph identifying a subset of input files in the build tree that are actually used by the one or more build commands to generate the output files.

2. The method of claim 1 wherein the one or more build commands are invoked using a wrapper command that enables the intercepting of the operating system calls.

3. The method of claim 1 wherein the dependency graph includes, for each output file, a path from the output file to one or more of the subset of input files.

4. The method of claim 1 wherein the dependency graph further identifies how the subset of input files are used by the one or more build commands to generate the output files.

5. The method of claim 1 further comprising:
receiving a list of input files in the build tree that meet one or more predefined criteria;
comparing the list to the subset of input files identified by the dependency graph as being used to generate the output files; and
returning those input files in the subset that match the list.

6. The method of claim 5 wherein the one or more predefined criteria include a criterion identifying input files that are subject to an open source license.

7. A non-transitory computer readable storage medium having stored thereon program code executable by one or more computer systems, the program code embodying a method that comprises:
executing one or more build commands for generating output files for a software product, the software product being associated with a build tree comprising input files;
concurrently with the executing of the one or more build commands:
intercepting operating system calls invoked by the one or more build commands; and
for each intercepted operating system call:
determining whether the intercepted operating system call is relevant to process creation, file access, or file creation; and
if the intercepted operating system call is relevant to process creation, file access, or file creation, collecting information pertaining to the intercepted operating system call, wherein collecting information pertaining to the intercepted operating system call comprises:
logging information regarding one or more input files that are accessed or one or more output files that are created by the one or more build commands using the intercepted operating system call; and
creating a dependency graph based on the collected information, the dependency graph identifying a subset of input files in the build tree that are actually used by the one or more build commands to generate the output files.

8. The non-transitory computer readable storage medium of claim 7 wherein the one or more build commands are invoked using a wrapper command that enables the intercepting of the operating system calls.

9. The non-transitory computer readable storage medium of claim 7 wherein the dependency graph includes, for each output file, a path from the output file to one or more of the subset of input files.

10. The non-transitory computer readable storage medium of claim 7 wherein the dependency graph further identifies how the subset of input files are used by the one or more build commands to generate the output files.

11. The non-transitory computer readable storage medium of claim 7 wherein the method further comprises:
receiving a list of input files in the build tree that meet one or more predefined criteria;
comparing the list to the subset of input files identified by the dependency graph as being used to generate the output files; and
returning those input files in the subset that match the list.

12. The non-transitory computer readable storage medium of claim 11 wherein the one or more predefined criteria include a criterion identifying input files that are subject to an open source license.

13. A computer system comprising:
a processor; and
a non-transitory computer readable medium having stored thereon program code that, when executed, causes the processor to:
execute one or more build commands for generating output files for a software product, the software product being associated with a build tree comprising input files;
concurrently with the executing of the one or more build commands:
intercept operating system calls invoked by the one or more build commands; and
for each intercepted operating system call:
determine whether the intercepted operating system call is relevant to process creation, file access, or file creation; and
if the intercepted operating system call is relevant to process creation, file access, or file creation, collect information pertaining to the intercepted operating system call, wherein collecting information pertaining to the intercepted operating system call comprises:
logging information regarding one or more input files that are accessed or one or more output files that are created by the one or more build commands using the intercepted operating system call; and
create a dependency graph based on the collected information, the dependency graph identifying a subset of input files in the build tree that are actually used by the one or more build commands to generate the output files.

14. The computer system of claim 13 wherein the one or more build commands are invoked using a wrapper command that enables the intercepting of the operating system calls.

15. The computer system of claim 13 wherein the dependency graph includes, for each output file, a path from the output file to one or more of the subset of input files.

16. The computer system of claim 13 wherein the dependency graph further identifies how the subset of input files are used by the one or more build commands to generate the output files.

17. The computer system of claim 13 wherein the program code further causes the processor to:
receive a list of input files in the build tree that meet one or more predefined criteria;
compare the list to the subset of input files identified by the dependency graph as being used to generate the output files; and
return those input files in the subset that match the list.

18. The computer system of claim 17 wherein the one or more predefined criteria include a criterion identifying input files that are subject to an open source license.

* * * * *